(12) United States Patent
Hosein et al.

(10) Patent No.: US 10,922,907 B2
(45) Date of Patent: *Feb. 16, 2021

(54) INTERACTIVE AUGMENTED REALITY FUNCTION

(71) Applicant: eBay Inc., San Jose, CA (US)

(72) Inventors: Marc Peter Hosein, Saratoga, CA (US); Steve Yankovich, San Jose, CA (US); Steve Romero, Portland, OR (US); Selina Lam, Castro Valley, CA (US); Krystal Rose Higgins, Campbell, CA (US)

(73) Assignee: eBay Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/548,104

(22) Filed: Aug. 22, 2019

(65) Prior Publication Data
US 2019/0378362 A1  Dec. 12, 2019

Related U.S. Application Data

(63) Continuation of application No. 15/252,013, filed on Aug. 30, 2016, now abandoned, which is a
(Continued)

(51) Int. Cl.
*G07C 5/08* (2006.01)
*G07C 5/00* (2006.01)
(Continued)

(52) U.S. Cl.
CPC ........... *G07C 5/0808* (2013.01); *G01C 21/36* (2013.01); *G06F 16/24* (2019.01); *G06F 16/248* (2019.01);
(Continued)

(58) Field of Classification Search
CPC ........... G05B 19/00; G06F 13/00; G06F 9/44; G01M 1/00
See application file for complete search history.

(56) References Cited

U.S. PATENT DOCUMENTS 6,925,489 B1  8/2005  Curtin
7,095,748 B2  8/2006  Vij et al.
(Continued)

FOREIGN PATENT DOCUMENTS

EP  2256650 A1  12/2010
FR  2917195 A1  12/2008
WO  2014/028464 A1  2/2014

OTHER PUBLICATIONS

"Augmented Reality as Tools for Maintenance and Service for Rittal", Retrieved from the Internet URL: <https://www.youtube.com/watch?v=airEeveKmNQ>, May 27, 2011, 3 pages.
(Continued)

*Primary Examiner* — Hussein Elchanti
(74) *Attorney, Agent, or Firm* — Faegre Drinker

(57) ABSTRACT

An apparatus is provided including a processor, a memory, and a vehicle tracking portal. The vehicle tracking portal is configured to obtain vehicle identification information regarding a vehicle. Then diagnostic information regarding the vehicle can be obtained. Then, based on the vehicle identification and the diagnostic information, a recommended service for the vehicle can be determined. A user can then be alerted to the recommended service.

20 Claims, 12 Drawing Sheets

Related U.S. Application Data continuation of application No. 14/954,673, filed on Nov. 30, 2015, now Pat. No. 9,460,568, which is a continuation of application No. 14/629,102, filed on Feb. 23, 2015, now Pat. No. 9,202,317, which is a continuation of application No. 13/955,885, filed on Jul. 31, 2013, now Pat. No. 8,965,624.

(60) Provisional application No. 61/682,973, filed on Aug. 14, 2012.

(51) Int. Cl.

| | | |
|---|---|---|
| *G06F 16/24* | (2019.01) | |
| *G06F 16/248* | (2019.01) | |
| *G06F 16/951* | (2019.01) | |
| *G06F 16/9535* | (2019.01) | |
| *G06Q 10/06* | (2012.01) | |
| *G06Q 30/08* | (2012.01) | |
| *G01C 21/36* | (2006.01) | |
| *H04W 88/02* | (2009.01) | |

(52) U.S. Cl.
CPC ........ *G06F 16/951* (2019.01); *G06F 16/9535* (2019.01); *G06Q 10/06* (2013.01); *G06Q 30/08* (2013.01); *G07C 5/006* (2013.01); *G07C 5/008* (2013.01); *H04W 88/02* (2013.01); *G07C 2205/02* (2013.01)

(56) References Cited

U.S. PATENT DOCUMENTS

| | | | |
|---|---|---|---|
| 7,783,249 B2 | 8/2010 | Robinson | |
| 7,904,219 B1 | 3/2011 | Lowrey et al. | |
| 8,965,624 B2 * | 2/2015 | Hosein | G06Q 30/08 |
| | | | 701/29.1 |
| 9,202,317 B2 * | 12/2015 | Hosein | G06Q 10/06 |
| 9,330,505 B2 | 5/2016 | Hosein et al. | |
| 9,330,647 B1 | 5/2016 | Bay et al. | |
| 9,460,568 B2 * | 10/2016 | Hosein | G01C 21/36 |
| 9,734,640 B2 | 8/2017 | Hosein et al. | |
| 9,984,515 B2 | 5/2018 | Hosein et al. | |
| 2002/0022984 A1 | 2/2002 | Daniel et al. | |
| 2002/0023039 A1 | 2/2002 | Fritsch et al. | |
| 2002/0193923 A1 | 12/2002 | Toyama et al. | |
| 2003/0114206 A1 | 6/2003 | Timothy et al. | |
| 2004/0039646 A1 | 2/2004 | Hacker | |
| 2004/0039677 A1 | 2/2004 | Mura et al. | |
| 2004/0046711 A1 | 3/2004 | Triebfuerst | |
| 2004/0217852 A1 | 11/2004 | Kolls | |
| 2005/0187838 A1 | 8/2005 | Squeglia et al. | |
| 2006/0111145 A1 | 5/2006 | Kelly et al. | |
| 2006/0129290 A1 | 6/2006 | Zimmerman et al. | |
| 2006/0271248 A1 | 11/2006 | Cosgrove et al. | |
| 2007/0014536 A1 | 1/2007 | Hellman | |
| 2007/0143816 A1 | 6/2007 | Gupta et al. | |
| 2007/0250229 A1 | 10/2007 | Wu | |
| 2007/0273610 A1 | 11/2007 | Baillot | |
| 2008/0042875 A1 | 2/2008 | Harrington et al. | |
| 2008/0082221 A1 | 4/2008 | Nagy | |
| 2008/0088597 A1 | 4/2008 | Prest et al. | |
| 2008/0100570 A1 | 5/2008 | Friedrich et al. | |
| 2008/0129684 A1 | 6/2008 | Adams et al. | |
| 2008/0189110 A1 | 8/2008 | Freeman et al. | |
| 2008/0228689 A1 | 9/2008 | Tewary et al. | |
| 2008/0242280 A1 | 10/2008 | Shapiro et al. | |
| 2008/0261516 A1 | 10/2008 | Robinson | |
| 2009/0030619 A1 | 1/2009 | Kameyama | |
| 2009/0064169 A1 | 3/2009 | Nguyen et al. | |
| 2009/0083141 A1 | 3/2009 | Craine | |
| 2009/0150167 A1 | 6/2009 | Patenaude et al. | |
| 2009/0265212 A1 | 10/2009 | Hyman et al. | |
| 2009/0318777 A1 | 12/2009 | Kameyama | |
| 2010/0044121 A1 | 2/2010 | Simon et al. | |
| 2010/0057341 A1 | 3/2010 | Bradburn et al. | |
| 2010/0211259 A1 | 8/2010 | Mcclellan | |
| 2010/0235891 A1 | 9/2010 | Oglesbee et al. | |
| 2010/0274480 A1 | 10/2010 | Mccall | |
| 2010/0280956 A1 | 11/2010 | Chutorash et al. | |
| 2010/0311254 A1 | 12/2010 | Huang | |
| 2011/0004523 A1 | 1/2011 | Giuli et al. | |
| 2011/0035031 A1 | 2/2011 | Faenger et al. | |
| 2011/0087430 A1 | 4/2011 | Boss et al. | |
| 2011/0093160 A1 | 4/2011 | Ramseyer | |
| 2011/0096036 A1 | 4/2011 | Mcintosh et al. | |
| 2011/0173539 A1 | 7/2011 | Rottler et al. | |
| 2011/0213628 A1 | 9/2011 | Peak et al. | |
| 2011/0288724 A1 | 11/2011 | Falk | |
| 2011/0288954 A1 | 11/2011 | Bertosa et al. | |
| 2011/0294520 A1 | 12/2011 | Zhou et al. | |
| 2011/0298702 A1 | 12/2011 | Sakata et al. | |
| 2012/0054028 A1 | 3/2012 | Tengler et al. | |
| 2012/0054036 A1 | 3/2012 | Nam et al. | |
| 2012/0072109 A1 | 3/2012 | Waite et al. | |
| 2012/0089474 A1 | 4/2012 | Xiao et al. | |
| 2012/0116550 A1 | 5/2012 | Hoffman et al. | |
| 2012/0123951 A1 | 5/2012 | Hyatt et al. | |
| 2012/0187916 A1 | 7/2012 | Duer et al. | |
| 2012/0249588 A1 | 10/2012 | Tison et al. | |
| 2012/0271713 A1 | 10/2012 | Nussel et al. | |
| 2012/0296513 A1 | 11/2012 | Ramseyer | |
| 2013/0024113 A1 | 1/2013 | Weng et al. | |
| 2013/0031088 A1 | 1/2013 | Srikrishna et al. | |
| 2013/0046592 A1 | 2/2013 | Ross | |
| 2013/0080371 A1 | 3/2013 | Harber et al. | |
| 2013/0117739 A1 | 5/2013 | Mueller et al. | |
| 2013/0120449 A1 | 5/2013 | Ihara et al. | |
| 2013/0303192 A1 | 11/2013 | Louboutin et al. | |
| 2013/0317694 A1 | 11/2013 | Merg et al. | |
| 2014/0025660 A1 | 1/2014 | Mohammed et al. | |
| 2014/0026156 A1 | 1/2014 | Deephanphongs | |
| 2014/0052327 A1 | 2/2014 | Hosein et al. | |
| 2014/0052559 A1 | 2/2014 | Hosein et al. | |
| 2014/0052745 A1 | 2/2014 | Hosein et al. | |
| 2015/0170437 A1 | 6/2015 | Hosein et al. | |
| 2016/0086398 A1 | 3/2016 | Hosein et al. | |
| 2016/0239554 A1 | 8/2016 | Hosein et al. | |
| 2016/0371900 A1 | 12/2016 | Hosein et al. | |
| 2017/0330394 A1 | 11/2017 | Hosein et al. | |

OTHER PUBLICATIONS

"BMW Augmented Reality", Retrieved from the Internet URL: <https://www.youtube.com/watch?v=P9KPJIA5yds>, Oct. 3, 2007, 3 pages.

Non-Final Office Action received for U.S. Appl. No. 13/955,885, dated Jul. 9, 2014, 10 pages.

Notice of Allowance received for U.S. Appl. No. 13/955,885 dated Oct. 16, 2014, 5 pages.

Response to Non-Final Office Action filed on Oct. 9, 2014, for U.S. Appl. No. 13/955,885, dated Jul. 9, 2014, 11 pages.

Applicant Initiated Interview Summary received for U.S. Appl. No. 13/961,359, dated Oct. 4, 2016, 3 pages.

Final Office Action received for U.S. Appl. No. 13/961,359 dated Jul. 25, 2016, 21 pages.

Non-Final Office Action received for U.S. Appl. No. 13/961,359 dated Mar. 11, 2016, 23 pages.

Notice of Allowance received for U.S. Appl. No. 13/961,359 dated Apr. 13, 2017, 19 pages.

Response to Final Office Action filed on Sep. 26, 2016, for U.S. Appl. No. 13/961,359, dated Jul. 25, 2016, 9 pages.

Response to Non-Final Office Action filed on Jun. 13, 2016, for U.S. Appl. No. 13/961,359, dated Mar. 11, 2016, 11 pages.

Final Office Action received for U.S. Appl. No. 13/965,407 dated Oct. 29, 2015, 8 pages.

Non-Final Office Action received for U.S. Appl. No. 13/965,407 dated May 29, 2015, 8 pages.

Notice of Allowance received for U.S. Appl. No. 13/965,407 dated Jan. 7, 2016, 9 pages.

(56) References Cited

OTHER PUBLICATIONS

Response to Final Office Action filed on Dec. 18, 2015 for U.S. Appl. No. 13/965,407, dated Oct. 29, 2015, 6 pages.
Response to Non-Final Office Action filed on Aug. 31, 2015 for U.S. Appl. No. 13/965,407, dated May 29, 2015, 6 pages.
312 Amendment filed on Oct. 28, 2015, for U.S. Appl. No. 14/629,102, 3 pages.
Notice of Allowance received for U.S. Appl. No. 14/629,102, dated Jul. 28, 2015, 7 pages.
International Written Opinion received for PCT Application No. PCT/US2013/054693, dated Jan. 10, 2014, 6 pages.
Preliminary Amendment received for U.S. Appl. No. 14/629,102, dated Feb. 27, 2015, 6 pages.
PTO Response to 312 Amendment dated Nov. 6, 2015, for U.S. Appl. No. 14/629,102, 2 pages.
Response to Pre-interview First Office Action filed on Jun. 8, 2015, for U.S. Appl. No. 14/629,102, dated Apr. 7, 2015, 4 pages.
Final Office Action received for U.S. Appl. No. 14/954,673, dated Apr. 15, 2016, 7 pages.
Notice of Allowance received for U.S. Appl. No. 14/954,673, dated Jun. 9, 2016, 5 pages.
Pre-Interview First Office Action received for U.S. Appl. No. 14/954,673, dated Feb. 5, 2016, 5 pages.
Response to Non-Final Office Action filed on May 11, 2016, for U.S. Appl. No. 14/954,673, dated Apr. 15, 2016, 7 pages.
Applicant Initiated Interview Summary received for U.S. Appl. No. 15/138,877, dated Aug. 16, 2017, 3 pages.
Applicant Initiated Interview Summary received for U.S. Appl. No. 15/138,877, dated Mar. 23, 2017, 3 pages.
Final Office Action received for U.S. Appl. No. 15/138,877, dated Jun. 8, 2017, 9 pages.
Non-Final Office Action received for U.S. Appl. No. 15/138,877, dated Dec. 12, 2016, 9 pages.
Notice of Allowance received for U.S. Appl. No. 15/138,877, dated Nov. 1, 2017, 9 pages.
Notice of Allowance received for U.S. Appl. No. 15/138,877 dated Jan. 26, 2018, 8 pages.
Preliminary Amendment received for U.S. Appl. No. 15/138,877, filed on Apr. 29, 2016, 6 pages.
Response to Final Office Action filed on Aug. 20, 2017, for U.S. Appl. No. 15/138,877, dated Jun. 8, 2017, 10 pages.
Response to Non-Final Office Action filed on Apr. 12, 2017, for U.S. Appl. No. 15/138,877, dated Dec. 12, 2016, 10 pages.
Preliminary Amendment received for U.S. Appl. No. 15/656,337, dated Aug. 3, 2017, 7 pages.
Henderson, et al., "Augmented Reality for Maintenance and Repair (ARMAR)", Retrieved from the Internet URL: <http://citeseerx.ist.psu.edu/viewdoc/download?doi=10.1.1.149.4991&rep=rep1&type=pdf>, Aug. 2007, 70 pages.
Lyden, "6 Mobile Applications to Prevent Distracted Driving Accidents", Retrieved from the internet URL:<http://www.automotive-fleet.com/channel/safety-accident-management/article/story/2011/08/6-mobile-applications-to-prevent-distracted-driving-accidents.aspx>, Aug. 2011, 10 pages.
International Preliminary Report on Patentability received for PCT Application No. PCT/US2013/054693, dated Feb. 26, 2015, 8 pages.
International Search Report received for PCT Application No. PCT/US2013/054693, dated Jan. 10, 2014, 3 pages.
Advisory Action received for U.S. Appl. No. 15/252,013, dated May 24, 2018, 3 pages.
Applicant Initiated Interview Summary received for U.S. Appl. No. 15/252,013, dated Apr. 13, 2018, 3 pages.
Applicant initiated Interview Summary received for U.S. Appl. No. 15/252,013, dated Aug. 3, 2018, 3 pages.
Final Office Action received for U.S. Appl. No. 15/252,013, dated Dec. 18, 2018, 10 pages.
Final Office Action received for U.S. Appl. No. 15/252,013, dated Mar. 12, 2018, 10 pages.
Non-Final Office Action received for U.S. Appl. No. 15/252,013, dated Jul. 16, 2018, 8 pages.
Non-Final Office Action received for U.S. Appl. No. 15/252,013, dated Sep. 22, 2017, 13 pages.
Preliminary Amendment received for U.S. Appl. No. 15/252,013, filed Sep. 7, 2016, 7 pages.
Response to Final Office Action filed on Jun. 18, 2019 for U.S. Appl. No. 15/252,013, dated Dec. 18, 2018, 12 pages.
Response to Final Office Action filed on May 14, 2018 for U.S. Appl. No. 15/252,013 dated Mar. 12, 2018, 17 pages.
Response to Non-Final Office Action filed on Dec. 22, 2017 for U.S. Appl. No. 15/252,013, dated Sep. 22, 2017, 11 pages.
Response to Non-Final Office Action filed on Oct. 12, 2018, for U.S. Appl. No. 15/252,013, dated Jul. 16, 2018, 19 pages.
Non-Final Office Action received for U.S. Appl. No. 15/656,337, dated Jul. 9, 2019, 12 pages.
Pre-Interview First Office Action received for U.S. Appl. No. 14/629,102, dated Apr. 7, 2015, 5 pages.

\* cited by examiner

INTERACTIVE AUGMENTED REALITY FUNCTION

CROSS-REFERENCE TO RELATED APPLICATIONS

This application is a continuation of U.S. patent application Ser. No. 15/252,013 filed on Aug. 30, 2016, which is a continuation of U.S. patent application Ser. No. 14/954,673 filed on Nov. 30, 2015, now issued as U.S. Pat. No. 9,460,568, which application is a continuation of U.S. patent application Ser. No. 14/629,102 filed on Feb. 23, 2015, now issued as U.S. Pat. No. 9,202,317, which is a continuation of U.S. patent application Ser. No. 13/955,885, filed on Jul. 31, 2013, now issued as U.S. Pat. No. 8,965,624, which claims the benefit of priority to U.S. Provisional Patent Application Ser. No. 61/682,973, filed Aug. 14, 2012, the benefit of priority of each of which is claimed hereby, and each of which are incorporated by reference herein in its entirety.

TECHNICAL FIELD

This application relates generally to vehicles. More particularly, this application relates to a method and system of a vehicle tracking portal.

BACKGROUND

Most households own at least one vehicle, typically an automobile or truck, but sometimes other vehicles as well, such as motorcycles, boats, all-terrain vehicles (ATVs), etc. It can be sometimes be difficult to track actions related to these vehicles, such as vehicle diagnostics, service appointments, replacement parts, etc.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, vehicle-related applications are able to provide various functions, such as monitoring vehicle diagnostics, scheduling service appointments, prepay for vehicle service using online or mobile payment services, locating desired items at a local store, providing driving directions, and the like. Information can be displayed on either an in-vehicle display system such as a head unit, or on a user's mobile device.

In a further example embodiment, the head unit or other component of a vehicle can be tied electronically with a user's mobile device. This connection may be either via a wired connection, such as a USB connection, or via a wireless connection, such as Bluetooth or IEEE 802.11. The mobile device may further have connectivity to the general Internet via a wireless connection, such as cell phone network such as Code Division Multiple Access (CDMA), Global System for Mobile Communication (GSM), 3G, 4G, or other wireless mechanism such as IEEE 802.11 or WiMax.

In an example embodiment, the vehicle may leverage the two facts that (1) the head unit or component in the vehicle that is communicating with the mobile device is built-into the vehicle; and (2) that the mobile device has connectivity to outside data sources. This allows the system to provide applications that are tied to the precise vehicle, yet still are able to access outside data sources such as the Internet.

In another example embodiment, this leverage may be used to provide various levels of vehicle service. This includes the ability to provide service reminders to the user (using car diagnostic data, for example), schedule service appointments for the vehicle (using the aforementioned car diagnostic data and a user's mobile calendar application, for example), offer service coupons (using vehicle location, for example), purchase vehicle parts online (using the car diagnostic data and an online payment service, for example), provide directions to a local store having vehicle parts in stock (using the car diagnostic data and Global Positioning System (GPS) information, for example), and provide how-to-instructions (for example, how to change a tire).

Figure 1:
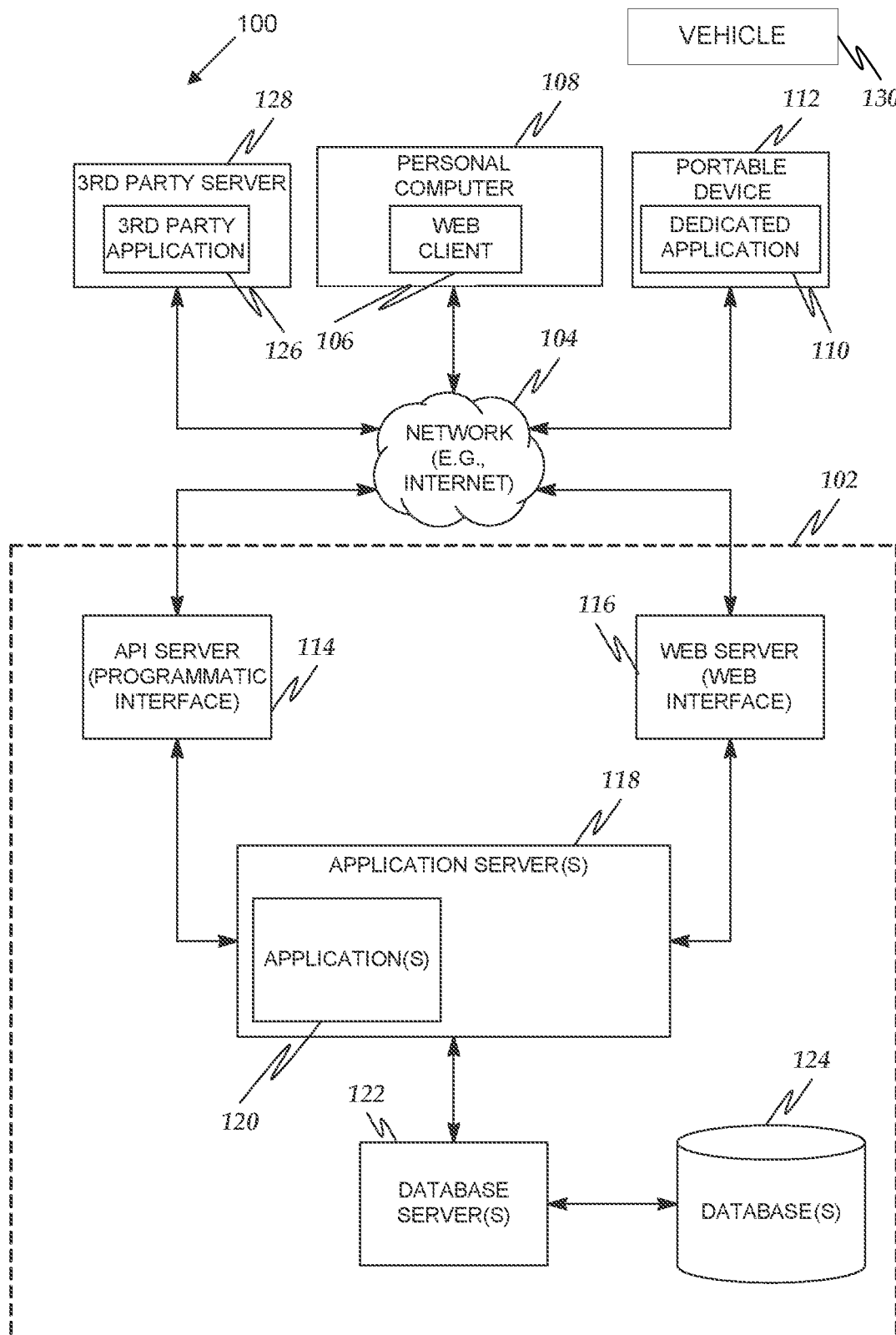
FIG. 1 is a network diagram depicting a client-server system, within which one example embodiment may be deployed.

FIG. 1 is a network diagram depicting a client-server system 100, within which one example embodiment may be deployed. A networked system 102, in the example form of a network-based marketplace or publication system, provides server-side functionality, via a network 104 (e.g., the Internet or a wide area network (WAN)) to one or more clients. FIG. 1 illustrates, for example, a web client 106 (e.g., a browser, such as the Internet Explorer browser developed by Microsoft Corporation of Redmond, Wash. State) executing on a personal computer 108 as well as a dedicated application 110 operating on a portable device such as a smartphone 112.

An API server 114 and a web server 116 are coupled to, and provide programmatic and web interfaces respectively to, one or more application servers 118. The application servers 118 may host one or more applications 120 related to vehicle tracking. The application servers 118 are, in turn, shown to be coupled to one or more database servers 122 that facilitate access to one or more databases 124.

The applications 120 may provide a number of marketplace functions and services to users who access the networked system 102. This may include sales of goods and/or services, payment processing, etc. Also included in these applications 120 may be a vehicle tracking portal, which may provide a centralized source for users to track various aspects of vehicles they own (or vehicles they may wish to own at some point).

Further, while the system shown in FIG. 1 employs a client-server architecture, the embodiments are, of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the dedicated application 110 accesses the various services and functions provided by the applications 120 via the programmatic interface provided by the API server 114. It should be noted that these embodiments are merely examples. It is, of course, possible that a dedicated application may operate on the personal computer 108, and that a web browser may operate on the mobile device 112.

The dedicated application 110 may, for example, be a client of a vehicle tracking portal (e.g., the eBay Motors application developed by eBay Inc., of San Jose, Calif.).

FIG. 1 also illustrates a third party application 126, executing on a third party server machine 128, as having programmatic access to the networked system 102 via the programmatic interface provided by the API server 114. For example, the third party application 126 may, utilizing information retrieved from the networked system 102, support one or more features or functions on a website hosted by the third party. The third party website may, for example, provide one or more promotional, marketplace, or payment functions that are supported by the relevant applications of the networked system 102.

Also present in the client-server system 100 may be one or more vehicles 130. The vehicle 130 may be owned by a user of the mobile device 112, or may be a vehicle the user is interested in purchasing at some point. As will be described later, the mobile device 112 may interact in various ways with the vehicle 130 to retrieve and send information relevant to the vehicle tracking portal. For example, a user may scan a vehicle identification number (VIN) of the vehicle 130 or take a picture of the vehicle 130 with mobile device 112 to identify the vehicle 130 to the portal and set up the vehicle 130 in the portal. Additionally, the mobile device 112 may interact with the vehicle 130 itself to obtain diagnostic information (such as by scanning error codes from a computer on the vehicle 130, or interacting wirelessly with a device that tracks diagnostic information in the vehicle 130).

Figure 2:
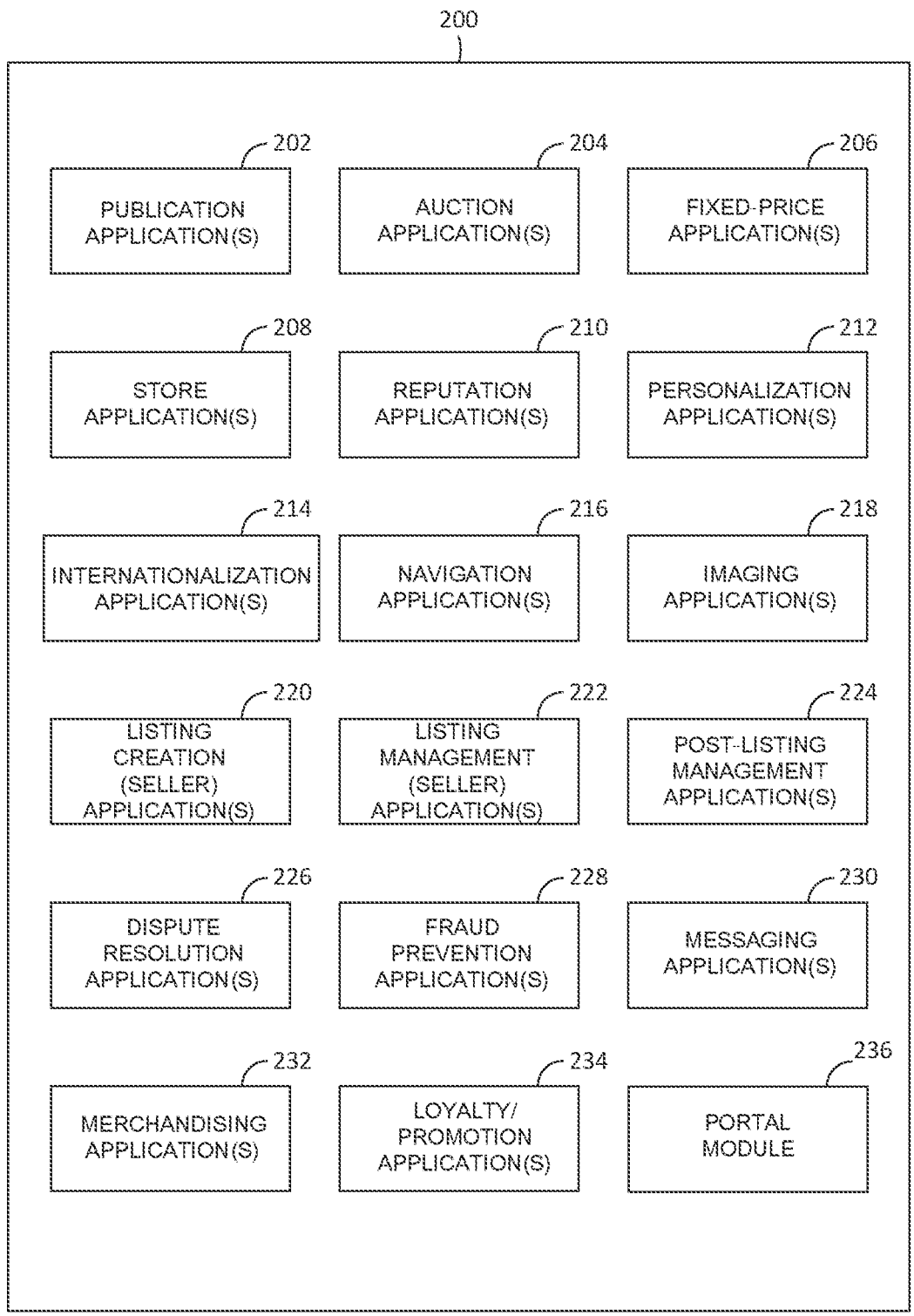
FIG. 2 is a block diagram illustrating a vehicle tracking portal application, which may be provided, in one example, as an application in the networked system.

FIG. 2 is a block diagram illustrating a vehicle tracking portal application 200, which may be provided, in one example, as application 120 in the networked system 102. The vehicle tracking portal application 200 may be hosted on dedicated or shared server machines (not shown) that are communicatively coupled to enable communications between server machines. The vehicle tracking portal application 200 may be communicatively coupled (e.g., via appropriate interfaces) to various data sources. The vehicle tracking portal application 200 may furthermore access one or more databases 124 via the database servers 122.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the vehicle tracking portal application 200 is shown to include (or link to) at least one publication application 202 and one or more auction applications 204, which support auction-format listing and price setting mechanisms (e.g., English, Dutch, Vickrey, Chinese, Double, Reverse auctions etc.). The various auction applications 204 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 206 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 208 allow a seller to group listings within a "virtual" store, which may be branded and otherwise personalized by and for the seller. Such a virtual store may also offer promotions, incentives, and features that are specific and personalized to a relevant seller.

Reputation applications 210 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 210 allow a user (for example, through feedback provided by other transaction partners) to establish a reputation within the networked system 102 over time. Other potential trading partners may then reference such a reputation for the purposes of assessing credibility and trustworthiness.

Personalization applications 212 allow users of the networked system 102 to personalize various aspects of their interactions with the networked system 102. For example a user may, utilizing an appropriate personalization application 212, create a personalized reference page at which information regarding transactions to which the user is (or has been) a party may be viewed. Further, a personalization application 212 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may accordingly include a number of internationalization applications 214 that customize information (and/or the presentation of information) by the networked system 102 according to predetermined criteria (e.g., geographic, demographic or marketplace criteria). For example, the internationalization applications 214 may be used to support the customization of information for a number of regional websites that are operated by the networked system 102 and that are accessible via respective web servers 116.

Navigation of the networked system 102 may be facilitated by one or more navigation applications 216. For example, a search application (as an example of a navigation application 216) may enable key word searches of listings published via the networked system 102. A browse application may allow users to browse various category, catalogue, or inventory data structures according to which listings may be classified within the networked system 102. Various other navigation applications 216 may be provided to supplement the search and browsing applications.

In order to make listings available via the networked system 102 as visually informing and attractive as possible, the applications 120 may include one or more imaging applications 218, which users may utilize to upload images for inclusion within listings. An imaging application 218 also operates to incorporate images within viewed listings. The imaging applications 218 may also support one or more promotional features, such as image galleries that are presented to potential buyers. For example, sellers may pay an additional fee to have an image included within a gallery of images for promoted items.

Listing creation applications 220 allow sellers to conveniently author listings pertaining to goods or services that they wish to transact via the networked system 102, and listing management applications 222 allow sellers to manage such listings. Specifically, where a particular seller has authored and/or published a large number of listings, the management of such listings may present a challenge. The listing management applications 222 provide a number of features (e.g., auto-relisting, inventory level monitors, etc.) to assist the seller in managing such listings. One or more post-listing management applications 224 also assist sellers with a number of activities that typically occur post-listing. For example, upon completion of an auction facilitated by one or more auction applications 204, a seller may wish to leave feedback regarding a particular buyer. To this end, a post-listing management application 224 may provide an interface to one or more reputation applications 210, so as to allow the seller conveniently to provide feedback regarding multiple buyers to the reputation applications 210.

Dispute resolution applications 226 provide mechanisms whereby disputes arising between transacting parties may be resolved. For example, the dispute resolution applications 226 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 228 implement fraud detection and prevention mechanisms to reduce the occurrence of fraud within the networked system 102.

Messaging applications 230 are responsible for the generation and delivery of messages to users of the networked system 102 (such as, for example, messages advising users regarding the status of listings at the networked system 102 (e.g., providing "outbid" notices to bidders during an auction process or to provide promotional and merchandising information to users). Respective messaging applications 230 may utilize any one of a number of message delivery networks and platforms to deliver messages to users. For example, messaging applications 230 may deliver electronic mail (e-mail), instant message (IM), Short Message Service (SMS), text, facsimile, or voice (e.g., Voice over IP (VoIP)) messages via the wired (e.g., the Internet), plain old telephone service (POTS), or wireless (e.g., mobile, cellular, WiFi, WiMAX) networks.

Merchandising applications 232 support various merchandising functions that are made available to sellers to enable sellers to increase sales via the networked system 102. The merchandising applications 232 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 234. For example, a buyer may earn loyalty or promotion points for each transaction established and/or concluded with a particular seller, and be offered a reward for which accumulated loyalty points can be redeemed.

A portal module 236 may then act to implement various user interface and back-end functions to provide the actual portal to a user.

Figure 3:
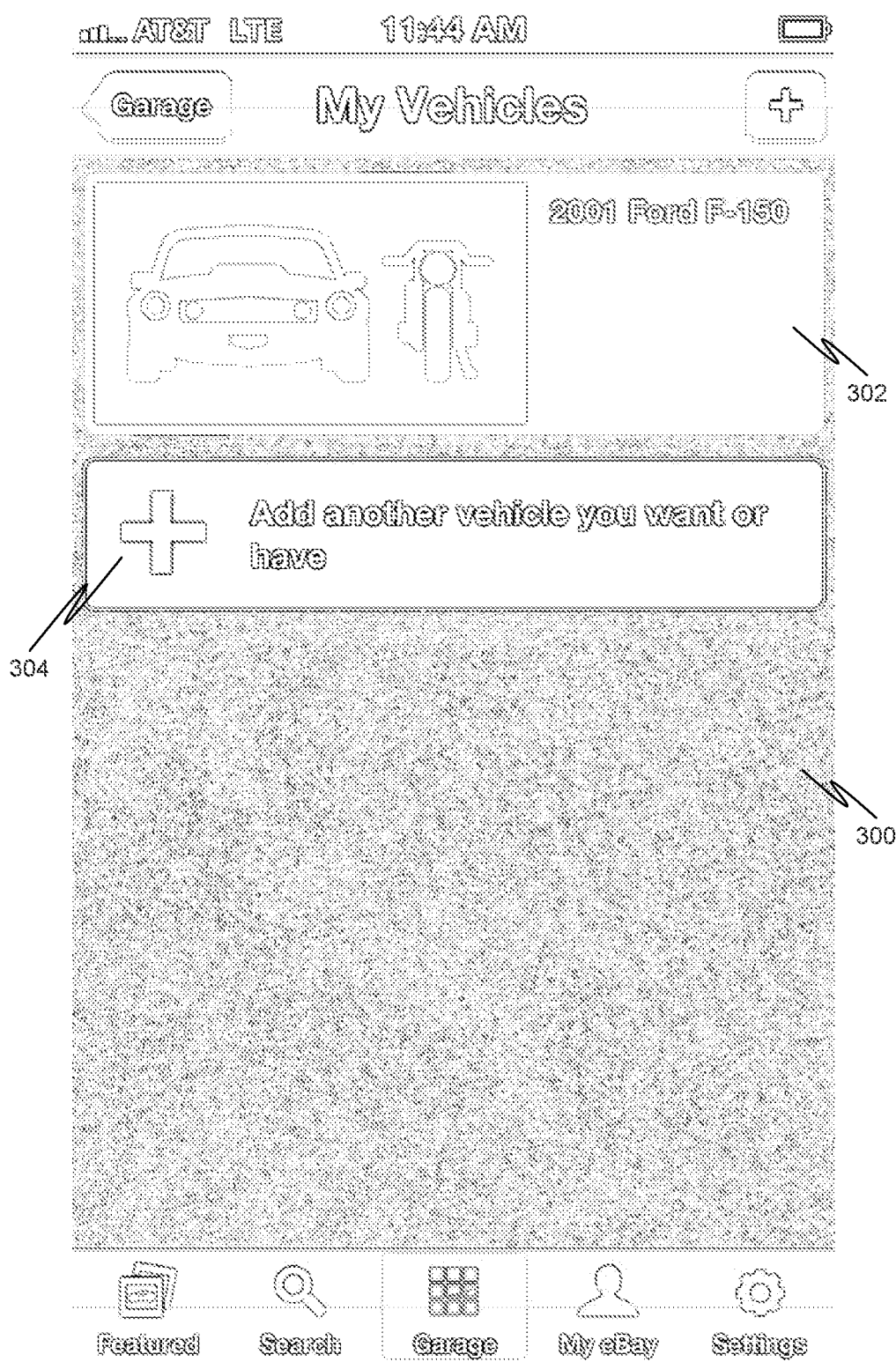
FIG. 3 is a screen capture illustrating a user interface presenting a user with a list of vehicles already linked to his or her account in the vehicle tracking portal application in accordance with an example embodiment.
Figure 4:
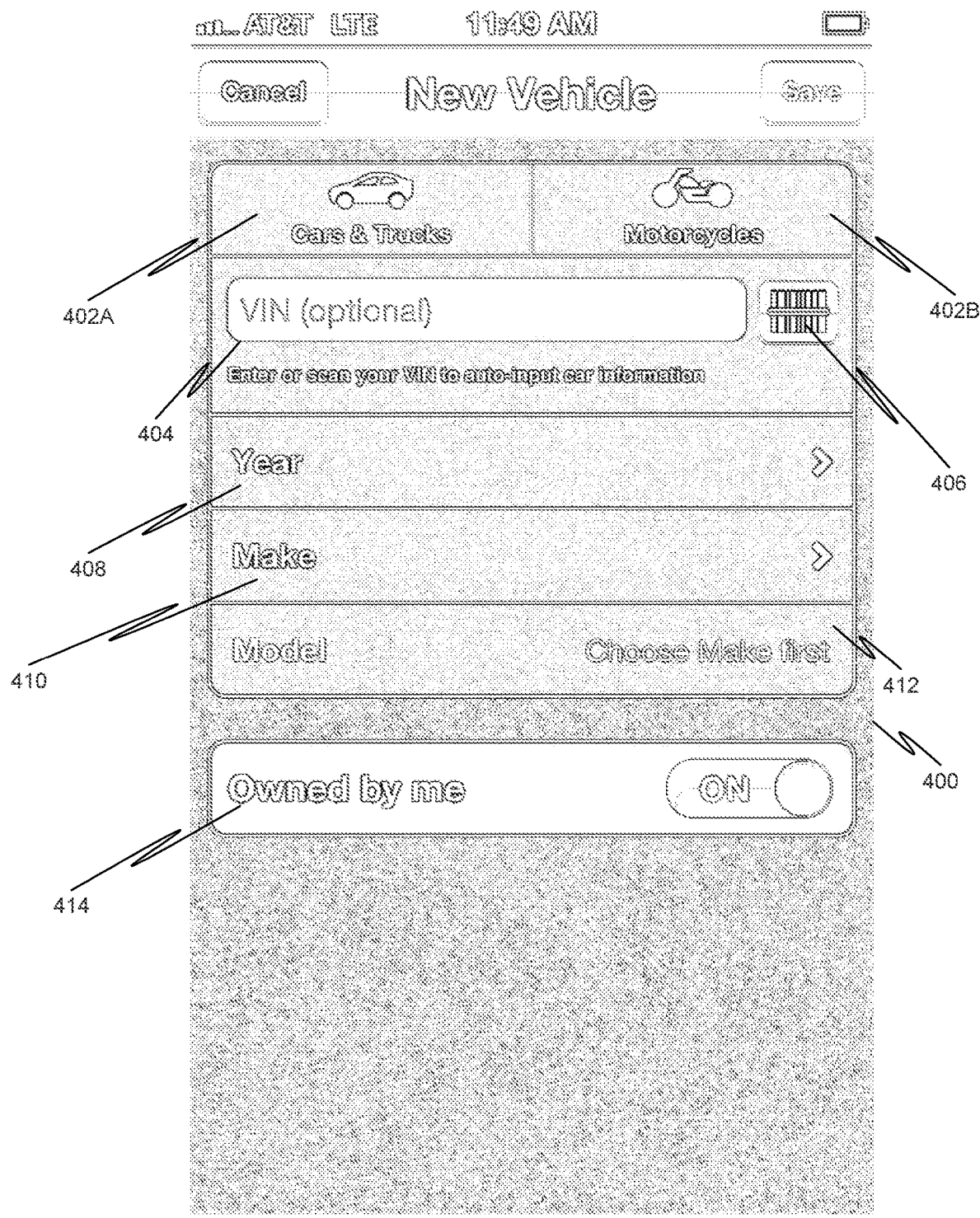
FIG. 4 is a screen capture illustrating a user interface presenting a user with an area to enter vehicle identification information in accordance with an example embodiment.
Figure 5:
FIG. 5 is a screen capture illustrating a user interface presenting a scan screen in accordance with an example embodiment.

In an example embodiment, a user may utilize a mobile device 112 to link one or more vehicles 130 with a vehicle tracking portal application 200. This may be accomplished in a variety of different ways. FIGS. 3-5 are screen captures illustrating linking a vehicle 130 to a vehicle tracking portal application 200 using a VIN for the vehicle 130. Specifically, in FIG. 3, a user interface 300 may present a user with a list of vehicles 302 already linked to his or her account in the vehicle tracking portal application 200, and a button 304 where the user can request to add another vehicle 130. Pressing this button 304 may result in the user interface 400 of FIG. 4, which includes tabs 402A, 402B to select between "cars & trucks" and "motorcycles." The user interface 400 additionally includes an area 404 where the user can enter the VIN of the vehicle 130. The user may either enter the VIN manually (e.g., by typing it in) or may press a scan button 406, which brings up a scan screen. FIG. 5 is a screen capture illustrating a user interface presenting a scan screen in accordance with an example embodiment. As can be seen, the user interface 500 includes a viewing area 502 depicting what is visible to a camera in the mobile device 112, and the user can move the mobile device 112 in front of a VIN on the vehicle 130 to scan the VIN.

Referring back to FIG. 4, the user can alternatively enter the year, make and model of the vehicle 130 using menus 408, 410, 412. This option may be useful to a user who does not know or doesn't wish to locate the VIN, or for users who do not actually own the vehicle 130 yet. To that extent, the user can indicate using button 414 whether or not the vehicle 130 is owned by the user.

In another example embodiment, the mobile device 112 may retrieve vehicle information via a wired or wireless link to the vehicle 130 itself. Some vehicles 130 now offer a networking system where devices can connect to the vehicle 130 for various applications. An example of this may be the SYNC® AppLink™ system offered by Ford Motor Company of Dearborn, Mich.

Figure 6:
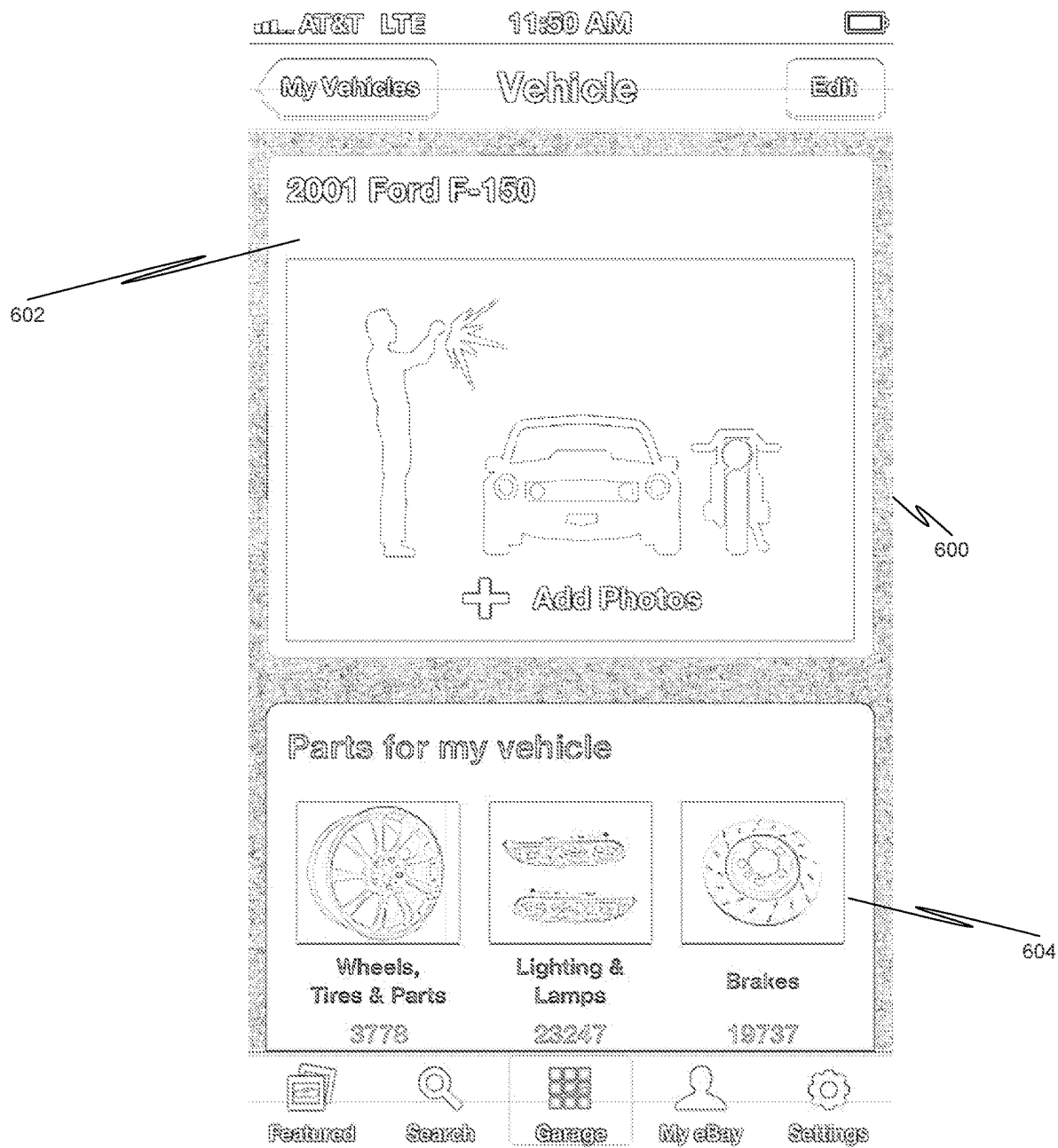
FIG. 6 is a screen capture illustrating a user interface presenting parts for a vehicle in accordance with an example embodiment.

In an example embodiment, once the vehicle 130 has been listed in the vehicle tracking portal application 200, various functions may be provided for the user based on the vehicle 130. FIG. 6 is a screen capture illustrating a user interface presenting parts for a vehicle 130 in accordance with an example embodiment. Here, the user interface 600 may identify the vehicle 602 as well as presenting a number of different parts 604 for sale. These may be parts being sold via auction, fixed price, or at third party sources. As more information is known about the vehicle 602, the different parts 604 presented may be dynamically modified. For example, if the vehicle 602 has 50,000 miles on it, then the parts 604 presented may be different than if the vehicle 602 has 150,000 miles on it. Likewise, if the vehicle 602 has a four cylinder engine, then the parts 604 presented may be different than if the vehicle 602 has a V6 engine.

Figure 7:
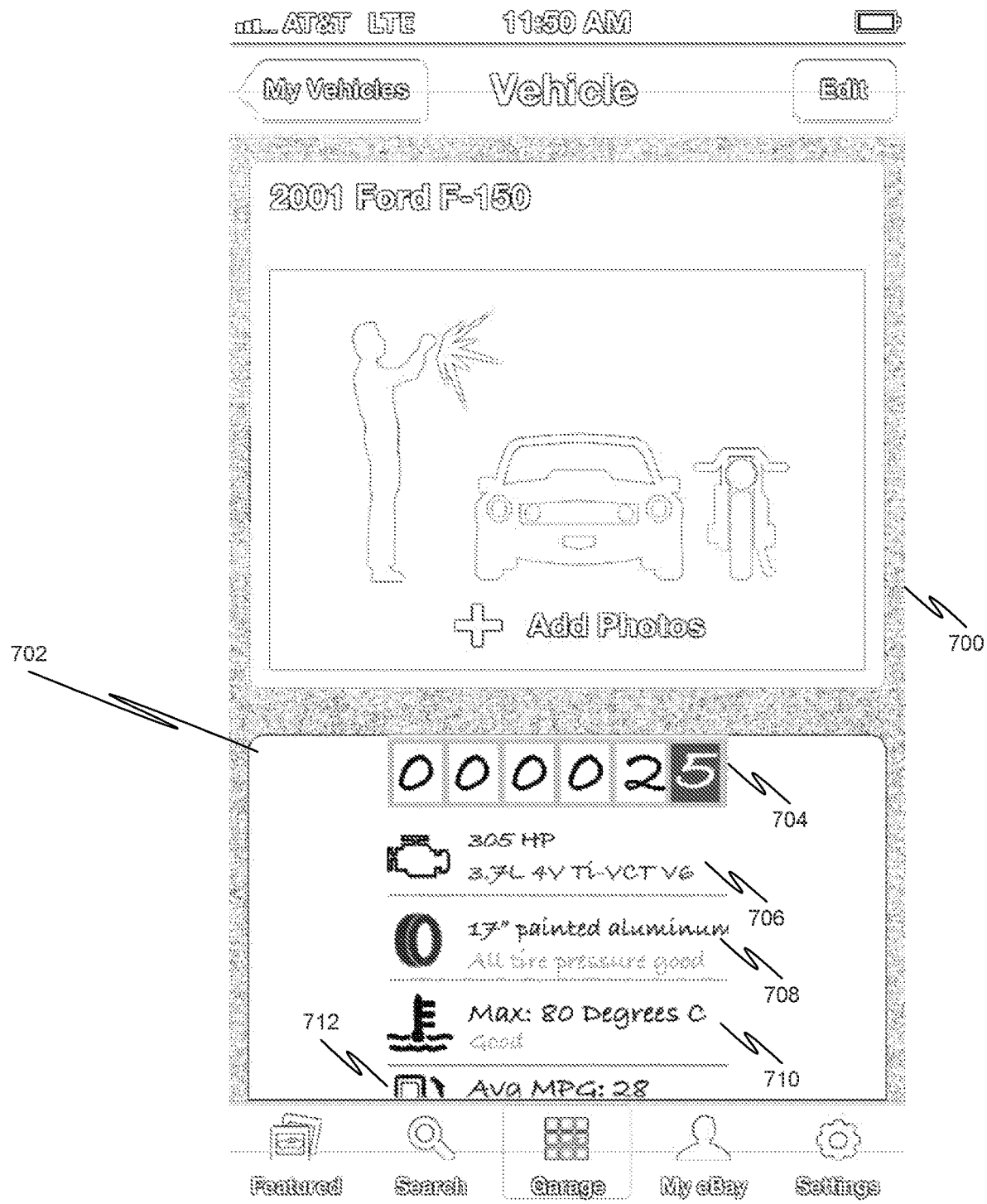
FIG. 7 is a screen capture illustrating a user interface presenting diagnostic information about a vehicle in accordance with an example embodiment.

In an example embodiment, diagnostic information about a vehicle 602 may be integrated into the vehicle tracking portal application 200. Diagnostic information is any information about an individual vehicle 602. This may include specification information, such as engine type, fuel type, horsepower, tire information, etc., odometer information, as well as performance information such as speed, miles per gallon, air conditioning functions. It may also include error or problem information, such as low tire, inefficient air conditioning, error codes generated in response to a check engine light, etc. FIG. 7 is a screen capture illustrating a user interface presenting diagnostic information about a vehicle in accordance with an example embodiment. The user interface 700 may present diagnostic information in window 702, including odometer information 704, engine type 706, tire type and status 708, air conditioning maximum and status 710, and average MPG 712.

Figure 8:
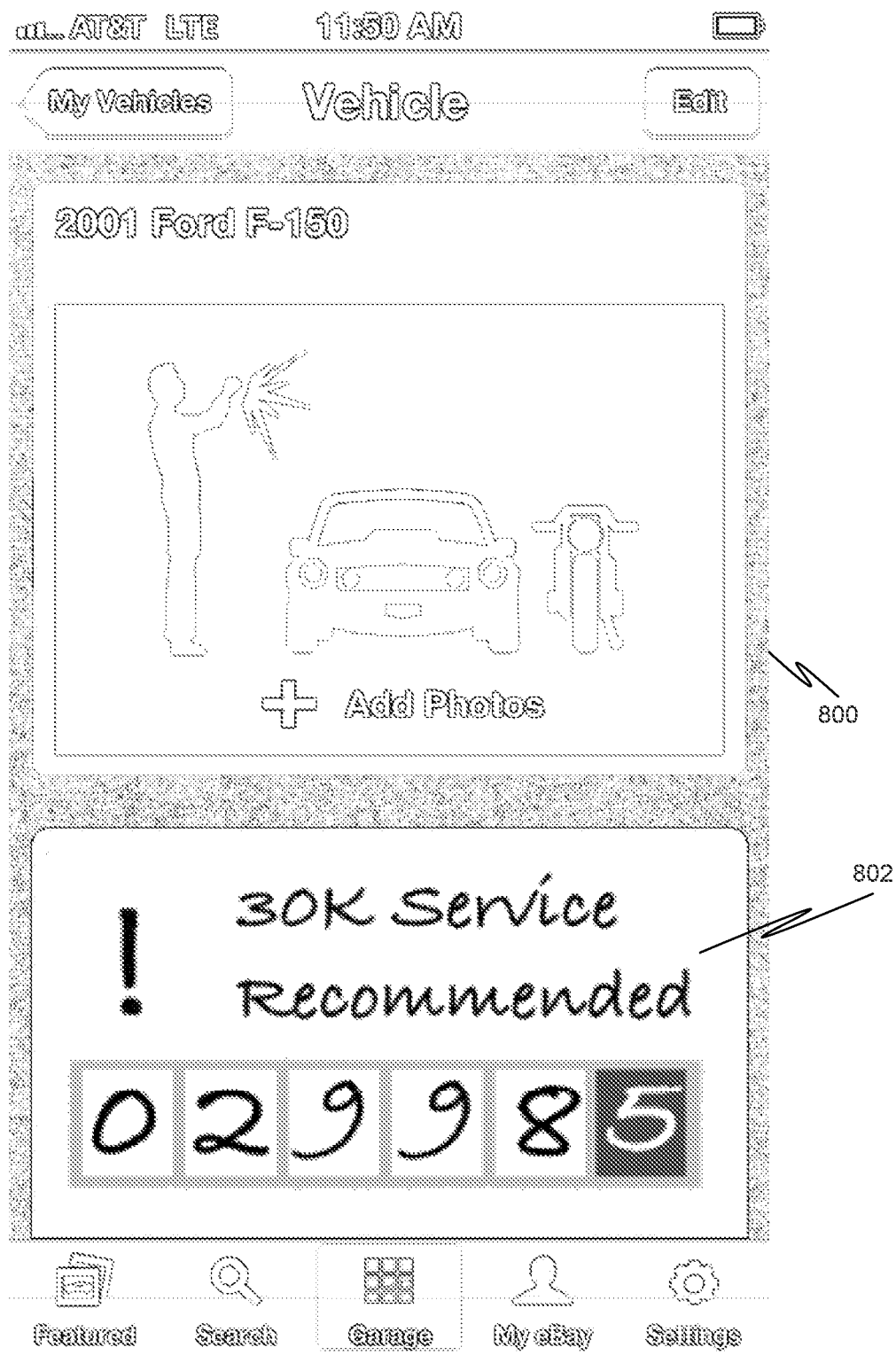
FIG. 8 is a screen capture illustrating a user interface presenting an alert that the user should schedule service in accordance with an example embodiment.

As described above, the diagnostic information may be utilized to present different parts available for sale that fit the vehicle. Additionally, this information may be utilized in order to recommend service or parts to repair certain conditions detected with the vehicle. For example, the vehicle tracking portal application 200 may access a database 124 which informs it that this vehicle 602 is due for a tune-up every 30,000 miles. The odometer information may be used to determine that the vehicle 602 has been driven 29,985 miles. The vehicle tracking portal application 200 may then contact the user and inform them that they should schedule a tune-up. FIG. 8 is a screen capture illustrating a user interface presenting an alert that the user should schedule service in accordance with an example embodiment. Here, the user interface 800 may present the alert 802 indicating the type of service recommended and the current odometer reading.

Figure 9:
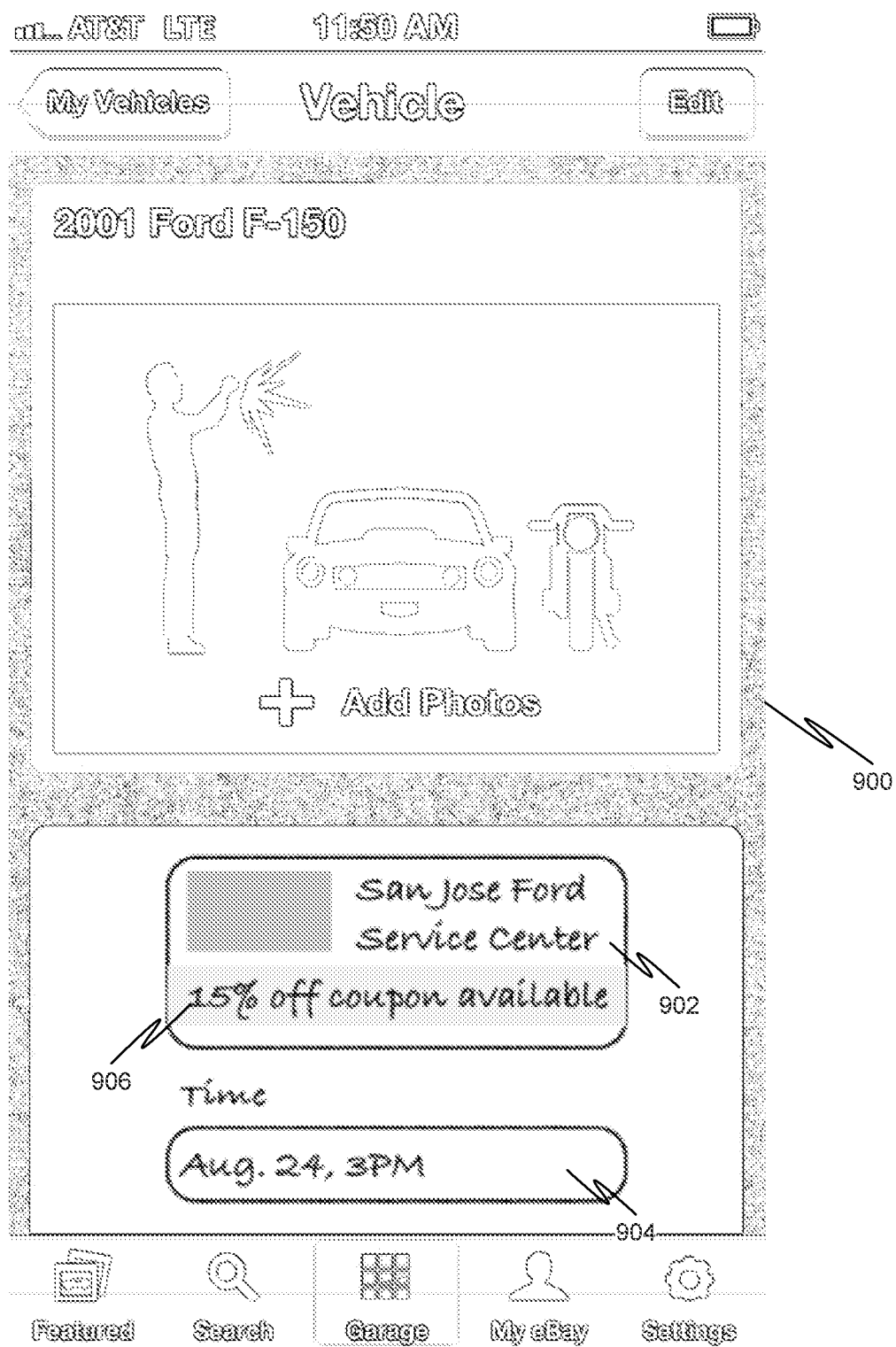
FIG. 9 is a screen capture illustrating a user interface presenting service centers to service a vehicle in accordance with an example embodiment.

Additionally, the vehicle tracking portal could locate dealers or mechanics in the user's area that can perform the service, and inform the user of this as well. In an example embodiment, the user may be presented with information indicating that a service appointment should be scheduled, along with a recommended service location. The user may then inform the vehicle tracking portal to go ahead and schedule the service, and the vehicle tracking portal may contact the service location and set up an appointment. FIG. 9 is a screen capture illustrating a user interface presenting service centers to service a vehicle in accordance with an example embodiment. The user interface 900 may present a list of service centers 902, along with dates and times available for appointments 904, allowing the user to easily select a date, time, and service center to perform the service. The user may select only the service center, date, and time, and the system can automatically schedule the appointment. Additionally, in some example embodiments, a coupon or coupons 906 for one or more of the service centers may be provided.

Additionally, the user may obtain turn-by-turn directions to the service center directly from the vehicle tracking portal.

In another example embodiment, the vehicle tracking portal may be used to pay for services to the vehicle. For example, the vehicle tracking portal may already contain financial information for the user, such as the user's credit card information, which allows the user to purchase, for example, parts for the vehicle, through the vehicle tracking portal. This financial information may also be used to pay for the service appointment.

In another example embodiment, the user may wish to perform services, such as maintenance, himself or herself. In such a case, the vehicle tracking portal can provide the user with how-to manuals specifically for the vehicle. Additionally, in an example embodiment, step-by-step directions can be provided in the form of an augmented reality guide. An augmented reality guide is a guide that overlays instructions or information about steps of a repair over an actual picture of a vehicle, such as a live picture taken with a camera of a mobile device of the vehicle's engine block.

Figure 10:
FIG. 10 is a screen capture illustrating a user interface presenting an augmented reality guide.

FIG. 10 is a screen capture illustrating a user interface presenting an augmented reality guide. Here, the user interface 1000 presents an image 1002 taken in real-time from a camera on a mobile device. Overlaid on the image 1002 are one or more objects, such as hand 1004, part 1006, and arrow 1010 indicating directions on how to locate and remove the part 1006.

Figure 11:
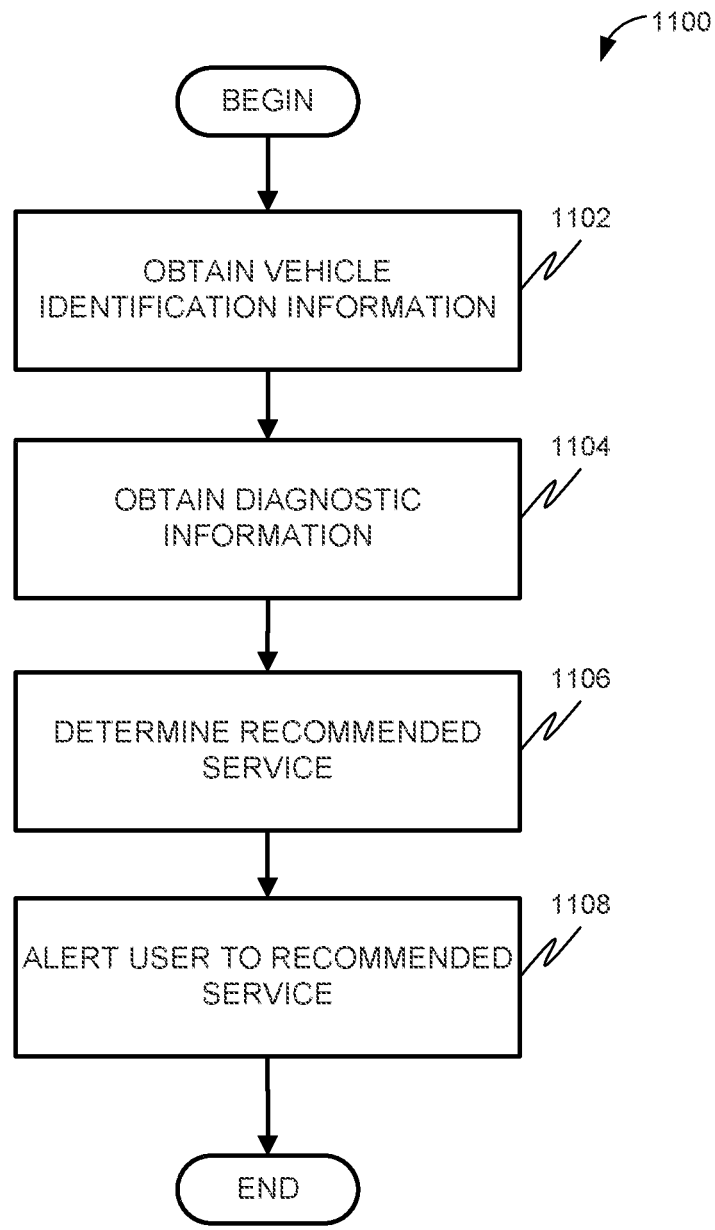
FIG. 11 is a flow diagram illustrating a method, in accordance with an example embodiment, of providing a vehicle tracking portal.

FIG. 11 is a flow diagram illustrating a method 1100, in accordance with an example embodiment, of providing a vehicle tracking portal. At operation 1102, vehicle identification information regarding a vehicle is obtained. At operation 1104, diagnostic information regarding the vehicle is obtained. At operation 1106, based on the vehicle identification information and the diagnostic information, a recommended service for the vehicle is determined. At operation 1008, a user is alerted to the recommended service.

Figure 12:
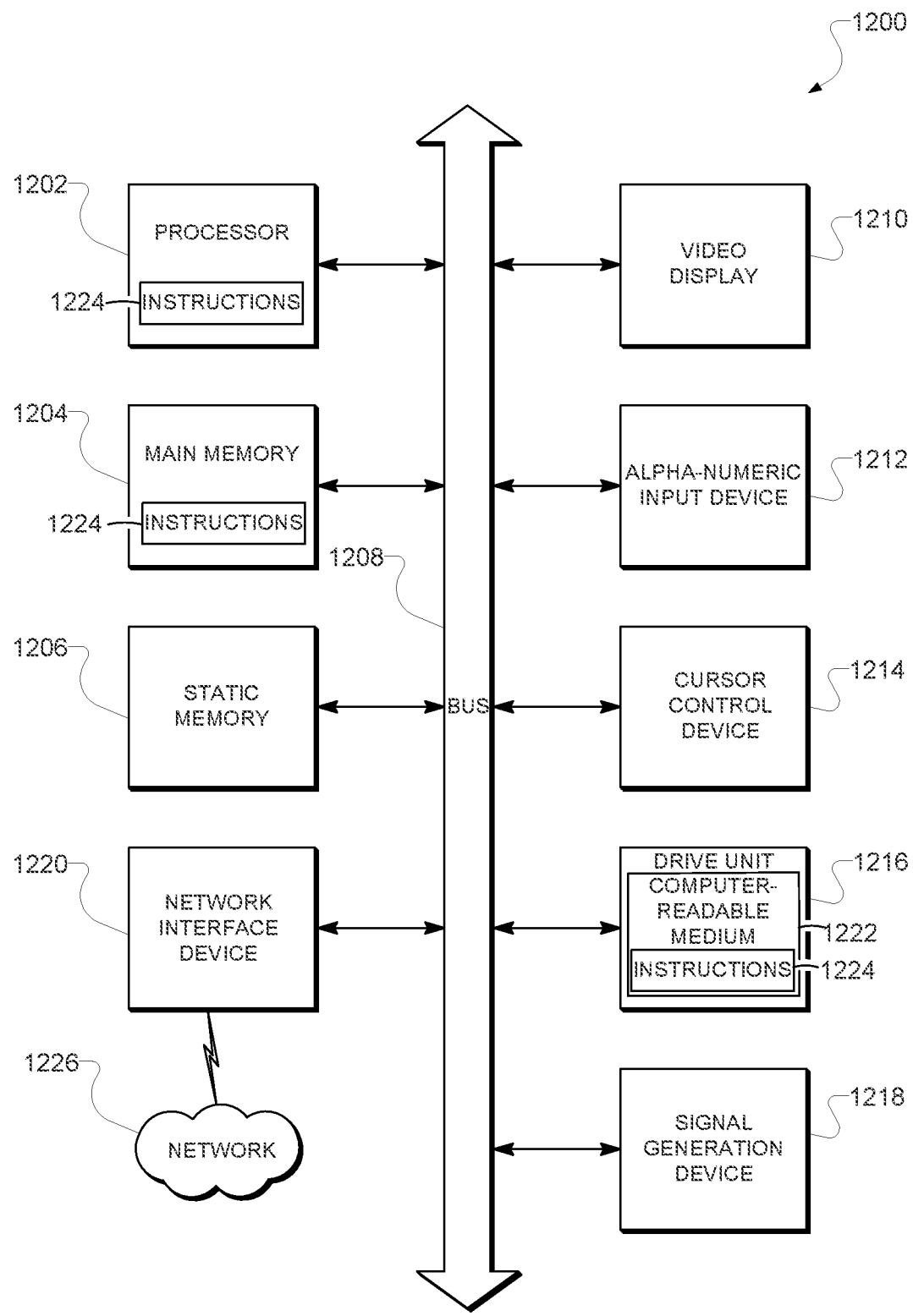
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system and within which instructions 1224 (e.g., software, a program, an application, an applet, an app, or other executable code) for causing the machine 1200 to perform any one or more of the methodologies discussed herein may be executed. In alternative embodiments, the machine 1200 operates as a standalone device or may be connected (e.g., networked) to other machines 1200. In a networked deployment, the machine 1200 may operate in the capacity of a server machine or a client machine in a server-client network environment, or as a peer machine in a peer-to-peer (or distributed) network environment. The machine 1200 may be a server computer, a client computer, a personal computer (PC), a tablet computer, a laptop computer 314, a netbook, a set-top box (STB), a personal digital assistant (PDA), a cellular telephone, a smartphone 112, a web appliance, a network router, a network switch, a network bridge, or any machine 1200 capable of executing the instructions 1224, sequentially or otherwise, that specify actions to be taken by that machine 1200. Further, while only a single machine 1200 is illustrated, the term "machine" shall also be taken to include a collection of machines 1200 that individually or jointly execute the instructions 1224 to perform any one or more of the methodologies discussed herein.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1204, and a static memory 1206, which are configured to communicate with each other via a bus 1208. The machine 1200 may further include a graphics display 1210 (e.g., a plasma display panel (PDP), a light emitting diode (LED) display, a liquid crystal display (LCD), a projector, or a cathode ray tube (CRT)). The machine 1200 may also include an alpha-numeric input device 1212 (e.g., a keyboard), a cursor control device 1214 (e.g., a mouse, a touchpad, a trackball, a joystick, a motion sensor, or other pointing instrument), a storage unit 1216, a signal generation device 1218 (e.g., a speaker), and a network interface device 1220.

The storage unit 1216 includes a machine-readable medium 1222 on which is stored the instructions 1224 embodying any one or more of the methodologies or functions described herein. The instructions 1224 may also reside, completely or at least partially, within the main memory 1204, within the processor 1202 (e.g., within the processor 1202's cache memory), or both, during execution thereof by the machine 1200. Accordingly, the main memory 1204 and the processor 1202 may be considered as machine-readable media 1222. The instructions 1224 may be transmitted or received over a network 1226 via the network interface device 1220.

As used herein, the term "memory" refers to a machine-readable medium 1222 able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media (e.g., a centralized or distributed database, or associated caches and servers) able to store instructions 1224. The term "machine-readable medium" shall also be taken to include any medium, or combination of multiple media, that is capable of storing instructions 1224 for execution by a machine (e.g., machine 1200), such that the instructions 1224, when executed by one or more processors 1202 of the machine 1200 (e.g., processor 1202), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

The instructions 1224 may further be transmitted or received over a communications network 1226 using a transmission medium via the network interface device 1220 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMAX networks). The term "transmission medium" shall be taken to include any intangible medium that is capable of storing, encoding, or carrying instructions 1224 for execution by the machine 1200, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 1222 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 1202 or a group of processors 1202) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor 1202, such as a field programmable gate array (FPGA) or an ASIC. A hardware module may also include programmable logic or circuitry that is temporarily configured by software to perform certain operations. For example, a hardware module may include software encompassed within a general-purpose processor 1202 or other programmable processor 1202. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor 1202 configured by software to become a special-purpose processor 1202, the general-purpose processor 1202 may be configured as respectively different special-purpose processors 1202 (e.g., comprising different hardware modules) at different times. Software may accordingly configure a processor 1202, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 1202 that are temporarily configured (e.g., by software) or permanently configured to perform the relevant operations. Whether temporarily or permanently configured, such processors 1202 may constitute processor-implemented modules that operate to perform one or more operations or functions described herein. As used herein, "processor-implemented module" refers to a hardware module implemented using one or more processors 1202.

Similarly, the methods described herein may be at least partially processor-implemented, a processor 1202 being an example of hardware. For example, at least some of the operations of a method may be performed by one or more processors 1202 or processor-implemented modules. Moreover, the one or more processors 1202 may also operate to support performance of the relevant operations in a "cloud computing" environment or as a "software as a service" (SaaS). For example, at least some of the operations may be performed by a group of computers (as examples of machines including processors), with these operations being accessible via a network 1226 (e.g., the Internet) and via one or more appropriate interfaces (e.g., an application program interface (API)).

The performance of certain of the operations may be distributed among the one or more processors 1202, not only residing within a single machine 1200, but deployed across a number of machines 1200. In some example embodiments, the one or more processors 1202 or processor-implemented modules may be located in a single geographic location (e.g., within a home environment, an office environment, or a server farm). In other example embodiments, the one or more processors 1202 or processor-implemented modules may be distributed across a number of geographic locations.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

The invention claimed is:

1. An apparatus comprising:
   a vehicle tracking portal executable by a processor on a mobile device of a user associated with a vehicle and configured to:
   obtain, via a camera of the mobile device, a live video feed of a vehicle component;
   obtain diagnostic information related to the vehicle component currently displayed in the live video feed;
   cause diagnostic information related to the vehicle component to be overlaid on the live video feed of the vehicle component on the mobile device;
   based at least upon the diagnostic information, provide step-by-step directions on how to replace or repair the vehicle component; and
   cause the step-by-step directions to be displayed as an overlay on the live video feed of the vehicle component.

2. The apparatus of claim 1, wherein the diagnostic information is an odometer reading for the vehicle.

3. The apparatus of claim 1, wherein the step-by-step directions include an augmented reality function executable by the mobile device of the user associated with the vehicle.

4. The apparatus of claim 1, wherein the vehicle tracking portal is further configured to allow the user associated with the vehicle to purchase vehicle parts via the mobile device.

5. The apparatus of claim 1, wherein the vehicle tracking portal is further configured to present a user interface on the mobile device to alert the user to schedule service pertaining to the set of one or more parts of the vehicle recommended for replacement.

6. The apparatus of claim 1, wherein the vehicle tracking portal is further configured to present a user interface to link one or more vehicles to the vehicle tracking portal by scanning a VIN of the one or more vehicles.

7. The apparatus of claim 1, wherein vehicle tracking portal is further configured to overlay one or more objects related to the step-by-step directions on the live video feed.

8. The apparatus of claim 7, wherein the one or more objects comprise at least one of a hand, a part, or an arrow.

9. A method comprising:
   obtaining, via a camera of the mobile device, a live video feed of a vehicle component;
   obtaining diagnostic information related to the vehicle component currently displayed in the live video feed;
   causing diagnostic information related to the vehicle component to be overlaid on the live video feed of the vehicle component on the mobile device;
   based at least upon the diagnostic information, providing step-by-step directions on how to replace or repair the vehicle component; and
   causing the step-by-step directions to be displayed as an overlay on the live video feed of the vehicle component.

10. The method of claim 9, wherein the diagnostic information is an odometer reading for the vehicle.

11. The method of claim 9, wherein the step-by-step directions include an augmented reality function executable by the mobile device of a user associated with the vehicle.

12. The method of claim 9, allowing a user associated with the vehicle to purchase vehicle parts via the mobile device.

13. The method of claim 9, further comprising overlaying one or more objects related to the step-by-step directions on the live video feed.

14. The method of claim 13, wherein the one or more objects comprise at least one of a hand, a part, or an arrow.

15. A non-transitory computer-readable storage medium comprising instructions that, when executed by at least one processor of a machine, cause the machine to perform operations comprising:
   obtaining, via a camera of the mobile device, a live video feed of a vehicle component;
   obtaining diagnostic information related to the vehicle component currently displayed in the live video feed;
   causing diagnostic information related to the vehicle component to be overlaid on the live video feed of the vehicle component on the mobile device;
   based at least upon the diagnostic information, providing step-by-step directions on how to replace or repair the vehicle component; and
   causing the step-by-step directions to be displayed as an overlay on the live video feed of the vehicle component.

16. The non-transitory computer-readable storage medium of claim 15, wherein the diagnostic information is an odometer reading for the vehicle.

17. The non-transitory computer-readable storage medium of claim 15, wherein the step-by-step directions include an augmented reality function executable by the mobile device of a user associated with the vehicle.

18. The non-transitory computer-readable storage medium of claim 15, wherein the operations further comprise allowing a user to purchase vehicle parts via the mobile device.

19. The non-transitory computer-readable storage medium of claim 15, wherein the operations further comprise overlaying one or more objects related to the step-by-step directions on the live video feed.

20. The non-transitory computer-readable storage medium of claim 19, wherein the one or more objects comprise at least one of a hand, a part, or an arrow.

* * * * *